June 21, 1960 H. W. TETER 2,941,498
MEASURING INSTRUMENT, INCLUDING REGISTERING
MEANS, WITH RESETTING MECHANISM
CONNECTED THEREWITH
Filed March 3, 1959 2 Sheets-Sheet 1

INVENTOR.
Howard W. Teter
BY Harold E. Cole
Attorney

June 21, 1960

H. W. TETER 2,941,498

MEASURING INSTRUMENT, INCLUDING REGISTERING
MEANS, WITH RESETTING MECHANISM
CONNECTED THEREWITH

Filed March 3, 1959

INVENTOR.
Howard W. Teter
BY Harold E. Cole
Attorney.

United States Patent Office 2,941,498
Patented June 21, 1960

2,941,498

MEASURING INSTRUMENT, INCLUDING REGISTERING MEANS, WITH RESETTING MECHANISM CONNECTED THEREWITH

Howard W. Teter, 347 Linden St., Wellesley, Mass.

Filed Mar. 3, 1959, Ser. No. 796,973

14 Claims. (Cl. 116—129)

This invention relates to a measuring instrument, such as a thermometer, that has registering hands, with resetting mechanism connected to said instrument to reset said registering hands.

One object of my invention is to provide means to instantly and simultaneously reset both said registering hands, by a single movement, regardless of their positions away from the main indicating pointer, so that a measuring instrument, which is out-of-doors, for instance, may be reset from a position indoors.

Another object is to provide resetting mechanism that applies a substantially equal rotating force to each of the registering hands; but in opposite clockwise directions, so that the position of the main indicator pointer will be undisturbed when the two registering hands are brought into physical contact with it from opposite directions.

A further object is to provide such resetting mechanism that has no physical connection with the registering hands except momentarily, when the resetting operation takes place.

The foregoing and other objects which will appear as the nature of the invention is better understood, may be accomplished by a construction, combination and operative arrangement of parts such as is disclosed by the drawings and specification. The nature of the invention is such as to render it susceptible to various changes and modifications, and therefore, I am not to be limited to the construction disclosed by the drawings nor to the particular parts described in the specification; but am entitled to all such changes therefrom as fall within the scope of my claims.

Figure 1:
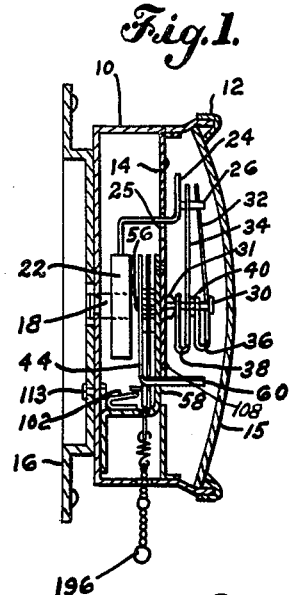
Fig. 1 is a sectional view taken on the line 1—1 of Fig. 2.
Figure 2:
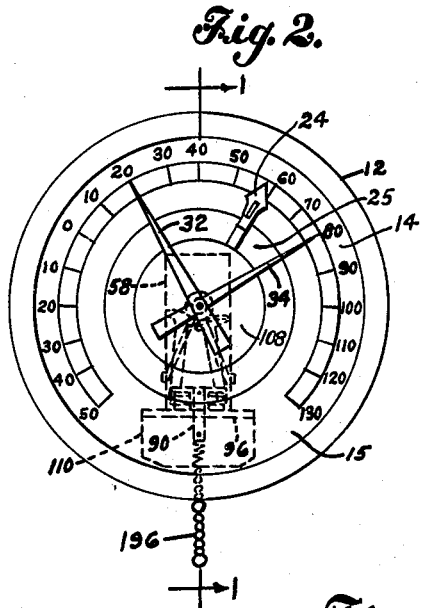
Fig. 2 is a front elevational view of my instrument with resetting mechanism.
Figure 3:
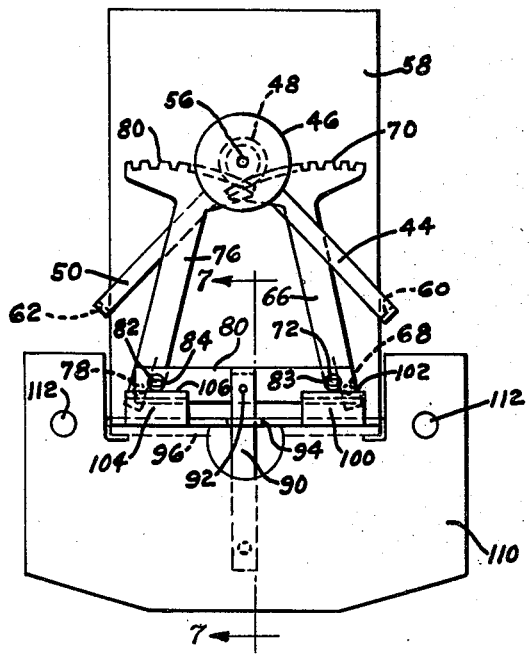
Fig. 3 is a rear elevational view of my resetting mechanism alone.
Figure 4:
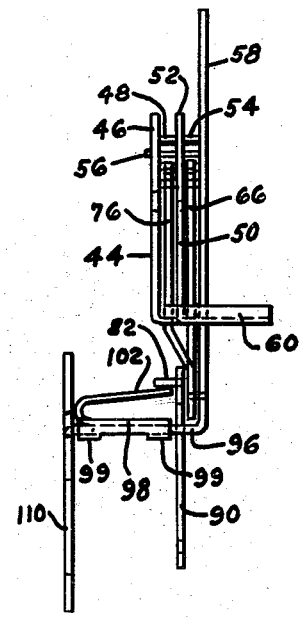
Fig. 4 is a side elevational view of the mechanism shown in Fig. 3.

My resetting mechanism is operatively connected to a thermometer, or other measuring instrument, having a moving system with a main indicator and maximum and minimum registering arm. Such an instrument is disclosed in my Patent No. 2,577,492, issued December 4, 1951.

As illustrated, a thermometer has a moving system with the usual casing or external support 10 having a bezel 12 and a well-known dial 14. The usual transparent glass 15 protects the mechanism, being set in said casing 10. A mounting bracket 16 fixed to said casing 10, enables the attachment of my instrument to a wall or elsewhere.

A supporting member or post 18 is attached to said casing 10 on which a well-known bi-metal temperature responsive coil 22 is mounted, and extending from said coil is the usual main indicator or temperature pointer 24 which extends through a circular opening 25 in said dial 14. A pusher pin 26 is attached to and extends perpendicularly from said main indicator 24.

A cover 108 in the form of a disc, later described, is attached as by screws 109 to resetter frame upper portion 58, later described, in a position concentric with said circular opening 15 in dial 14. A supporting staff 30 is fixedly set in a collar 31 attached to said cover 108, and rotatably mounted on said staff 30 is an upper or maximum registering hand 32 and a lower or minimum registering hand 34. Said hand 32 has a looped attaching portion 36 with holes alined therein, and likewise said hand 34 has a looped attaching portion 38 with holes alined therein, and said staff 30 extends through said holes in said hands 32 and 34. A collar 40, mounted on said staff 30, separates said registering hands 32 and 34. When either of said hands 32 and 34, during movement of said main indicator 24, is contacted by said pusher pin 26, that hand will move with it, since each is rotatably mounted on said staff 30; but unless such pressure is applied, said hands 32 and 34 will not move, since the looped portions are frictionally mounted on said staff 30.

Resetting mechanism has a reset arm 44 with an enlarged portion 46 at one end to which a small pinion 48 is fixed. A similar reset arm 50, with an enlarged end portion 52, has another small pinion 54 fixed thereto. These enlarged end portions 46 and 52 are circular and of greater diameter than said pinions 48 and 54, serving as guides for levers 66 and 76 later explained. A shaft 56 extends through holes in said end portions 46 and 52 and pinions 48 and 54, which end portions, together with said pinions, are rotatable thereon. One end of said shaft 56 is mounted in a supporting frame upper portion 58 of my resetting mechanism which is attached to said dial 14.

Said reset arm 44 has an angle portion or pusher finger 60 and said reset arm 50 has an angle portion or pusher finger 62. These fingers 60 and 62 extend far enough outwardly to intersect the path of, and contact, said registering arms 32 and 34 upon rotation, as later explained, and return them to starting position at opposite sides of, and next to, said main indicator 24.

An actuating lever 66 is movably pivoted, as at 68, at its lower end to said supporting frame upper portion 58 at one side thereof, and at its upper end it has a toothed portion or rack 70, the teeth of which mesh with the teeth of said pinion 48 on reset arm 44. Said lever 66 has a connecting member 72 extending perpendicularly a short distance from said pivot 68, later explained.

An actuating lever 76 is similar to lever 66, being movably pivoted, as at 78, at its lower end to said frame 58 at a side laterally opposite the pivot point of said lever 66. At its upper end said lever 76 has a toothed portion or rack 80, the teeth of which mesh with the teeth of pinion 54 on reset arm 50. Said lever 76 has a connecting member 82 extending perpendicularly a short distance from said pivot 78, later explained.

A lever actuating member shown as an equalizing bar 80 has a hole 83 at one side portion through which said connecting member 72 extends to join said bar 80 and actuating lever 66. Said bar 80 also has another hole 84 at a side portion laterally opposite to the side portion having said hole 83. Said connecting member 82 extends through this hole 84 to join said bar 80 and actuating lever 76, hence said actuating levers 66 and 76 are operatively connected to said equalizing bar 80. Said connecting members 72 and 82 are equi-distant from the center of said equalizing bar 80, and separate rivets, for instance, could be substituted for them.

A link 90 is movably pivoted as at 92 to said equalizing bar 80 at a point equally distant from said connecting members 72 and 86, and it extends downwardly from said bar 80 through a hole 94 in an intermediate frame portion 96 that extends perpendicularly from said supporting frame upper portion 58. Attached to the lower end of said link 90 is a pull member, such as a chain 196, pulling of which operates my reset mechanism. A flat spring member 98 is attached to said intermediate frame portion 96 by bent-over portions 99 under said frame portion 96 and it has a loop portion 100 extending above the latter from which a spring arm 102 extends to a point below and in contact with said connecting member 72 and forward of said equalizing bar 80. Said spring member 98 also has another loop portion 104 from which a spring arm 106 extends to a point below and in contact with said connecting member 82 and forward of said equalizing bar 80.

When said link 90 is pulled downwardly, it draws said equalizing bar 80 downwardly, or towards said hole 94, which actuates the resetting mechanism. Also said connecting members 82 and 86 force said spring arms 102 and 106 downwardly, putting them under tension. Consequently when said link 90 is released, said spring arms automatically force said equalizing bar 80 to normal position, thus reversing the rotative movement of said levers 66 and 76, and returning reset arms 44 and 50 to normal position. A cover 108 screwed as at 109, to said frame portion 58, conceals most of my mechanism.

From the foregoing it will be seen that actuation of said link 90, which is spaced slightly from said intermediate portion 96, causes said levers 66 and 76 to rotatively move towards each other, thus causing said pinions 48 and 54 to rotate in opposite directions. This causes either, or both, said reset arms 44 and 50 to rotate towards each other, thus contacting either or both of said registering arms 32 and 34, if out of normal position, and restoring them to normal position next to said main pointer 24. Thus it will be seen that by a simple movement of said link 90 said registering arms are restored to normal position.

Said supporting frame 58 has a mounting portion 110 extending downwardly having holes 112 therethrough to receive rivets 113 that attach it to said casing 10.

Figure 5:
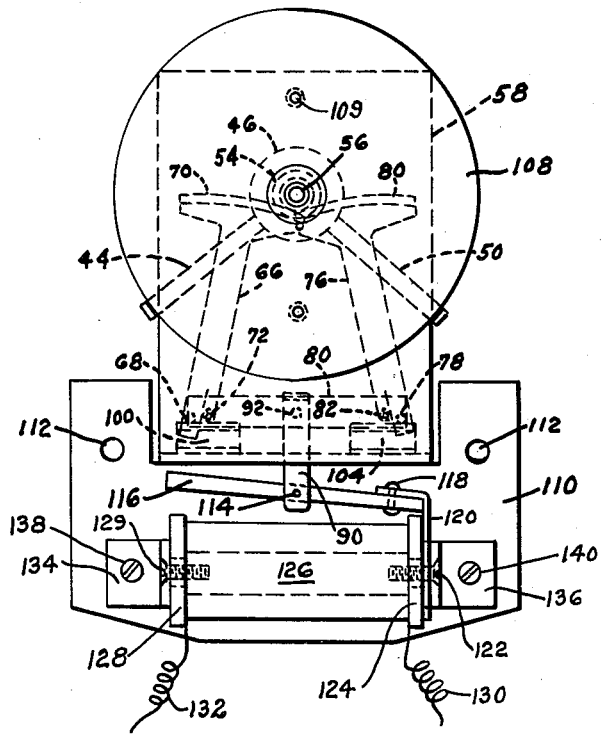
Fig. 5 is a rear elevational view of a modification, showing said resetting mechanism connected to electrical actuating means.
Figure 6:
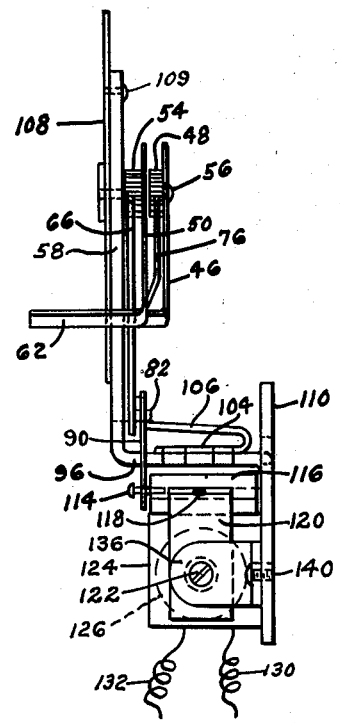
Fig. 6 is a side elevational view of the mechanism shown in Fig. 5.
Figures 7, 8:
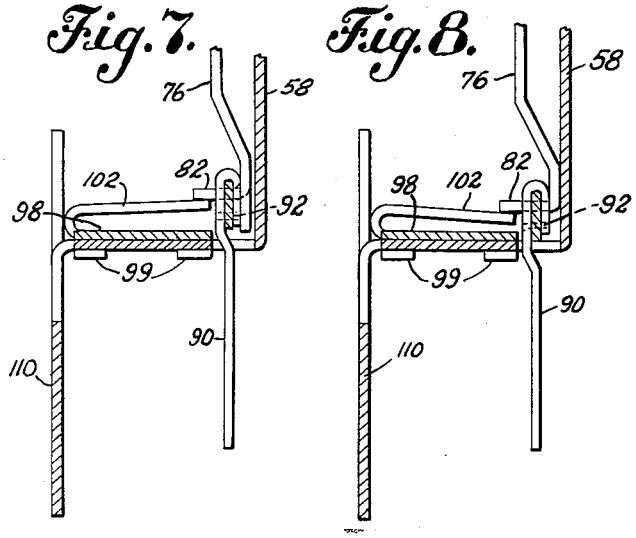
Fig. 7 is a sectional view, enlarged, taken on the line 7—7 of Fig. 3, showing the mechanism in normal position.
Fig. 8 is a sectional view, similar to Fig. 7; but showing the mechanism in actuating position.

Said link 90 may be actuated by various means and, as an instance, I show electrical actuating means in said Figs. 5 and 6. Said link is shown attached, by means of a pin 114, to a movable, soft iron armature 116 which is connected, as at 118, at one end, to a flexible strip 120 connected by a screw 122 to a pole piece 124 of a well-known electro-magnet 126 and to said lower frame portion 110. Said armature 116 is normally spaced at its other end from an opposite said pole piece 128, which latter is connected by a screw 129 to said lower frame portion 110. Electrical wires 130 and 132 connect to said electro-magnet 126 and they may connect with a source of electricity such as a dry cell or commercial electrical current.

Upon closing an electrical circuit, electrical current passes through said wires 130 and 132, which results in drawing said armature 116 towards said magnet 126 thus pulling said link 90 to thereby operate my reset mechanism.

A pair of angle brackets 134 and 136 are mounted on said lower frame portion 110 by means of screws 138 and 140 respectively.

When my resetting mechanism is actuated by a battery, bellows or the like, a relatively light force is available to operate it. However, if operated directly by hand, or by pulling said chain 196, considerable force is available, in which event the actuating member 80 could take the form of a single spring member that is attached directly to said levers 66 and 76, thus avoiding the use of a separate actuating member and a separate spring member that are shown in the drawing.

What I claim is:

1. A measuring instrument including a moving system having a main indicating pointer embodying a pusher member extending angularly therefrom, two registering hands in the path of movement of said pusher member, resetting mechanism, means connecting said mechanism to said instrument, said mechanism comprising a supporting frame, two rotatable pinions embodying toothed portions supported by said frame, two reset arms connected to and rotatable with said pinions, said registering hands being in the path of movement of said reset arms, two actuating levers movably pivoted to said frame and embodying toothed portions in mesh with said pinion toothed portions, an actuating member, and means connecting said actuating member to said levers whereby movement of said actuating member rotatively moves said levers.

2. A measuring instrument including a moving system having a main indicating pointer embodying a pusher member extending angularly therefrom, two registering hands in the path of movement of said pusher member, resetting mechanism, means connecting said mechanism to said instrument, said mechanism comprising a supporting frame, two rotatable pinions embodying toothed portions supported by said frame, two reset arms connected to and rotatable with said pinions, said registering hands being in the path of movement of said reset arms, two actuating levers movably pivoted to said frame and embodying toothed portions in mesh with said pinion tooth portions, an actuating member, means connecting said actuating member to said levers whereby movement of said actuating member rotatively moves said levers and an actuating link connected to and adapted to actuate said actuating member.

3. A measuring instrument including a moving system having a main indicating pointer embodying a pusher member extending angularly therefrom, two registering hands in the path of movement of said pusher member, resetting mechanism, means connecting said mechanism to said instrument, said mechanism comprising a supporting frame, two rotatable pinions embodying toothed portions supported by said frame, two reset arms connected to and rotatable with said pinions, said registering hands being in the path of movement of said reset arms, two actuating levers movably pivoted to said frame and extending diagonally towards each other and embodying toothed portions in mesh with said pinion toothed portions, an actuating member, means connecting said actuating member to said levers whereby movement of said actuating member rotatively moves said levers and an actuating link pivotally connected to and adapted to actuate said actuating member.

4. A measuring instrument including a moving system having a main indicating pointer embodying a pusher member extending angular therefrom, two registering hands in the path of movement of said pusher member, resetting mechanism, means connecting said mechanism to said instrument, said mechanism comprising a supporting frame, two rotatable pinions embodying toothed portions, two reset arms connected to and rotatable with said pinions, said registering hands being in the path of movement of said reset arms, two actuating levers movably pivoted to said frame and embodying toothed portions in mesh with said pinion toothed portions, an actuating member and two pin members attaching said actuating member at opposite portions thereof to said levers whereby movement of said actuating member rotatively moves said levers.

5. A measuring instrument including a moving system having a main indicating pointer embodying a pusher member extending angularly therefrom, two registering hands in the path of movement of said pusher member, resetting mechanism, means connecting said mechanism to said instrument, said mechanism comprising a supporting frame, two rotatable pinions embodying tooth portions, two reset arms connected to and rotatable with said pinions and embodying enlarged guide portions adjacent and opposite said pinions, said registering hands being in the path of movement of said reset arms, two actuating levers movably pivoted to said frame and embodying toothed portions in mesh with said pinion toothed portions, said enlarged guide portions overlying said lever toothed portions, an actuating member, and means connecting said actuating member to said levers, whereby movement of said actuating member rotatively moves said levers.

6. A measuring instrument including a moving system having a main indicating pointer embodying a pusher member extending angularly therefrom, two registering hands in the path of movement of said pusher member, resetting mechanism, means connecting said mechanism to said instrument, said mechanism comprising a supporting frame embodying a first supporting portion and another supporting portion extending angularly therefrom, and two rotatable pinions embodying toothed portions supported by said frame, two reset arms connected to and rotatable with said pinions, said registering hands being in the path of movement of said reset arms, two actuating levers movably pivoted to said frame first supporting portion and embodying toothed portions in mesh with said pinion toothed portions, an actuating member, and means connecting said actuating member to said levers whereby movement of said actuating member rotatively moves said levers, and actuate said actuating member.

7. A measuring instrument including a moving system having a main indicating pointer embodying a pusher member extending angularly therefrom, two registering hands in the path of movement of said pusher member, resetting mechanism, means connecting said mechanism to said instrument, said mechanism comprising a supporting frame embodying a first supporting portion and having a hole therethrough, two rotatable pinions, embodying toothed portions, two reset arms connected to and rotatable with said pinions, said registering hands being in the path of movement of said reset arms, a connecting pin member extending through said reset arms and pinions and said frame first portion, two actuating levers movably pivoted to said frame and embodying toothed portions in mesh with said pinion toothed portions, an actuating member, means connecting said actuating member to said levers whereby movement of said actuating member rotatively moves said levers, and an actuating link connected to and adapted to actuate said actuating member extending through said hole.

8. A measuring instrument including a moving system having a main indicating pointer embodying a pusher member extending angularly therefrom, two registering hands in the path of movement of said pusher member, resetting mechanism, means connecting said mechanism to said instrument, said mechanism comprising a supporting frame embodying a first supporting portion and another supporting portion extending angularly therefrom, two rotatable pinions, embodying toothed portions, supported by said frame, two reset arms connected to and rotatable with said pinions, said registering hands being in the path of movement of said reset arms, two actuating levers movably pivoted to said frame and embodying toothed portions in mesh with said pinion toothed portions, an actuating member, means connecting said actuating member to said levers whereby movement of said actuating member rotatively moves said levers, an actuating link connected to and adapted to actuate said actuating member, and a spring member operatively connected to said frame angular portion and so positioned as to be compressed by operative movement of said actuating member.

9. A measuring instrument including a moving system having a main indicating pointer embodying a pusher member extending angularly therefrom, two registering hands in the path of movement of said pusher member, resetting mechanism, means connecting said mechanism to said instrument, said mechanism comprising a supporting frame embodying a first supporting portion and another supporting portion extending angularly therefrom, two rotatable pinions, embodying toothed portions, supported by said frame, two reset arms connected to and rotatable with said pinions, said registering hands being in the path of movement of said reset arms, two actuating levers movably pivoted to said frame and embodying toothed portions in mesh with said pinion toothed portions, an actuating member, means connecting said actuating member to said levers whereby movement of said actuating member rotatively moves said levers, an actuating link connected to and adapted to actuate said actuating member, and a spring member between said frame angular portion and said actuating member adapted to be compressed by operative movement of said actuating member.

10. A measuring instrument including a moving system having a main indicating pointer embodying a pusher member extending angularly therefrom, two registering hands in the path of movement of said pusher member, resetting mechanism, means connecting said mechanism to said instrument, said mechanism comprising a supporting frame embodying a first supporting portion and another supporting portion extending angularly therefrom, two rotatable pinions, embodying toothed portions, supported by said frame, two reset arms connected to and rotatable with said pinions, said registering hands being in the path of movement of said reset arms, two actuating levers movably pivoted to said frame and embodying toothed portions in mesh with said pinion toothed portions, an actuating member, means connecting said actuating member to said levers whereby movement of said actuating member rotatively moves said levers, an actuating link connected to and adapted to actuate said actuating member, and a spring member, embodying two parallel portions spaced apart and a loop portion connecting the latter portions, said parallel portions being between said frame angular portion and said actuating member and adapted to be compressed by operative movement of said actuating member.

11. A measuring instrument including a moving system having a main indicating pointer embodying a pusher member extending angularly therefrom, two registering hands in the path of movement of said pusher member, resetting mechanism, means connecting said mechanism to said instrument, said mechanism comprising a supporting frame, two rotatable pinions embodying toothed portions supported by said frame, two reset arms connected to and rotatable with said pinions, said registering hands being in the path of movement of said reset arms, two actuating levers movably pivoted to said frame and embodying toothed portions in mesh with said pinion toothed portions, an actuating member, and means connecting said actuating member to said levers whereby movement of said actuating member rotatively moves said levers, a link connected to said actuating member, electrical instrumentalities embodying an electro-magnet having an armature, means connecting said armature to said link, and means connecting said electrical instrumentalities to said frame.

12. A measuring instrument including a moving system having a main indicating pointer embodying a pusher member extending angularly therefrom, two registering hands in the path of movement of said pusher member, resetting mechanism, said mechanism comprising a supporting frame embodying a first supporting portion and an intermediate portion extending angularly therefrom and having a hole therethrough, means connecting said frame to said instrument, two rotatable pinions, embodying toothed portions, pivotally mounted on said frame first portion, two reset arms connected to and rotatable with said pinions embodying angle portions adapted, upon rotative movement of said reset arms, to contact said registering hands, two actuating levers movably pivoted to said frame first portion at opposite side portions thereof and extending in opposite diagonal directions towards said pinions and embodying toothed portions in mesh with said pinion toothed portions, an actuating member, and a link extending through said intermediate portion hole, instrumentalities connecting said actuating member to said link, and two means connecting said levers to said link at substantially equi-distant points from said instrumentalities.

13. A measuring instrument including a moving system having a main indicating pointer embodying a pusher member extending angularly therefrom, two registering hands in the path of movement of said pusher member, resetting mechanism, said mechanism comprising a supporting frame embodying a first supporting portion, an intermediate portion extending angularly therefrom and having a hole therethrough, and a third portion extending angularly from said intermediate portion, means connecting said third portion to said instrument, two rotatable pinions, embodying toothed portions, pivotally mounted on said frame first portion, two reset arms connected to and rotatable with said pinions embodying angle portions adapted, upon rotative movement of said reset arms, to contact said registering hands, two actuating levers movably pivoted to said frame first portion at opposite side portions thereof and extending towards said pinions and embodying toothed portions in mesh with said pinion toothed portions, an actuating member, a link extending through said intermediate portion hole, instrumentalities connecting said actuating member to said link, and two means connecting said levers to said link at substantially equi-distant points from said instrumentalities.

14. A measuring instrument including a moving system having a main indicating pointer embodying a pusher member extending angularly therefrom, two registering hands in the path of movement of said pusher member, resetting mechanism, said mechanism comprising a supporting frame embodying a first supporting portion, an intermediate portion extending angularly therefrom and having a hole therethrough, and a third portion extending angularly from said intermediate portion, means connecting said third portion to said instrument, two rotatable pinions, embodying toothed portions, pivotally mounted on said frame first portion, two reset arms connected to and rotatable with said pinions embodying angle portions adapted, upon rotative movement of said reset arms, to contact said registering hands, two actuating levers movably pivoted to said frame first portion at opposite side portions thereof and extending towards said pinions and embodying toothed portions at one end in mesh with said pinion toothed portions, an actuating member, a link extending through said intermediate portion hole, instrumentalities connecting said actuating member to said link, and two means connecting lower end portions of said levers to said link at substantially equi-distant points from said instrumentalities.

References Cited in the file of this patent
UNITED STATES PATENTS 2,605,736     Cook                  Aug. 5, 1952